United States Patent
Fetzer et al.

(10) Patent No.: US 7,225,428 B1
(45) Date of Patent: May 29, 2007

(54) ROBUST SOFTWARE LIBRARY WRAPPER METHOD AND APPARATUS

(75) Inventors: Christof Fetzer, Chester, NJ (US); Zhen Xiao, Randolph, NJ (US)

(73) Assignee: AT&T Corp., New York, NY (US)

( * ) Notice: Subject to any disclaimer, the term of this patent is extended or adjusted under 35 U.S.C. 154(b) by 719 days.

(21) Appl. No.: 10/441,533

(22) Filed: May 20, 2003

(51) Int. Cl.
*G06F 9/44* (2006.01)

(52) U.S. Cl. .................................... 717/124

(58) Field of Classification Search ............... None
See application file for complete search history.

(56) References Cited

U.S. PATENT DOCUMENTS

| | | | |
|---|---|---|---|
| 5,991,707 A * | 11/1999 | Searles et al. ............ | 702/185 |
| 6,484,276 B1 * | 11/2002 | Singh et al. ............... | 714/41 |
| 6,634,019 B1 * | 10/2003 | Rice et al. ................. | 717/127 |
| 6,832,302 B1 * | 12/2004 | Fetzer et al. ............... | 711/170 |
| 6,892,163 B1 * | 5/2005 | Herzog et al. ............. | 702/181 |
| 6,917,839 B2 * | 7/2005 | Bickford .................... | 700/30 |
| 6,973,643 B2 * | 12/2005 | Goldsmith et al. ........ | 717/124 |

OTHER PUBLICATIONS

C. Fetzer and Z. Xiao, "Detecting Heap Smashing Attacks Through Fault Containment Wrappers,"pp. 80-89, Proc. of the 20th IEEE Symposium on Reliable Distributed Systems, Oct. 2001.*

C. Fetzer and Z. Xiao, "An automated approach to increasing the robustness of C libraries", pp. 155-164, Dependable Systems and Networks, 2002. Proceedings, International Conference on Jun. 23-26, 2002.*

Pascal Fradet and Mario Sudholt, "An aspect language for robust programming", Proceedings of the Workshop on Object-Oriented Technology, pp. 291-292, Lecture Notes In Computer Science; vol. 1743, 1999.*

Masaharu Goto, "CINT C/C++ interpreter," available at http://root.cern.ch/root/Cint.html, Jan. 8, 2002.

David G. Korn and K. Phong Vo, "Sfio: Safe/fast string/file IO," *Proceedings of USENIX Conference*, 1991, pp. 235-256.

J. DeVale and P. Koopman, "Robust Software—No More Excuses," *Proc. of the Int'l. Conf. on Dependable Systems and Networks*, Jun. 2002.

C. Fetzer and Z. Xiao, "Detecting Heap Smashing Attacks Through Fault Containment Wrappers," *Proc. of the 20th IEEE Symposium on Reliable Distributed Systems*, Oct. 2001.

J. DeVale and P. Koopman, "Performance Evaluation of Exception Handling in I/O Libraries," *Proc. of the Int'l. Conf. on Dependable Systems and Networks*, Jul. 2001.

(Continued)

Primary Examiner—Wei Zhen
Assistant Examiner—Chih-Ching Chow

(57) ABSTRACT

A method includes a step of executing a software function using a set of test arguments and obtaining a result corresponding to each of the set of test arguments, each result indicating one of a set of robust and non-robust results, a subset of test arguments corresponding to robust results. The method further includes defining a set of arguments based on the results and the set of test arguments, the set of arguments including the subset of test arguments. Thereafter, arguments of subsequent calls to the software function may thereafter be examined to determine whether they fall within the set of arguments.

4 Claims, 6 Drawing Sheets

OTHER PUBLICATIONS

*Linker and Libraries Guide*, Sun Microsystems, Jul. 2001, pp. 1-9, 121-142, 307-316.

P. Koopman and J. DeVale, "The Exception Handling Effectiveness of POSIX Operating Systems," *IEEE Trans. on Software Engineering*, vol. 26, No. 9, Sep. 2000, pp. 837-848.

A. Baratloo, N. Singh, and T. Tsai, "Transparent Run-Time Defense Against Stack Smashing Attacks," *Proc. of USENIX Annual Technical Conf.*, Jun. 2000.

F. Salles, M. Rodriguez, J-C. Fabre and J. Arlat, "MetaKernels and Fault Containment Wrappers," *Proc. of the 29th Int'l. Symposium on Fault-Tolerant Computing*, Jun. 1999, pp. 22-29.

N. Kropp, P. J. Koopman, and D. P. Siewiorek, "Automated Robustness Testing of Off-the-Shelf Software Components," *Proc. of the 28th Int'l. Symposium on Falut-Tolerant Computing*, Jun. 1998, pp. 30-37.

K-P. Vo, Y-M. Wang, P. E. Chung and Y. Huang, "Xept: A Software Instrumentation Method for Exception Handling," *Proc. of the 8th Int'l. Symposium on Software Reliability Engineering*, Nov. 1997, pp. 60-69.

* cited by examiner

ROBUST SOFTWARE LIBRARY WRAPPER METHOD AND APPARATUS

FIELD OF THE INVENTION

The present invention relates generally to library software routines called by application software, and more particularly, to software routines written in non-robust computer languages.

BACKGROUND OF THE INVENTION

Computer software may be written in any number of programming languages. Such languages include C, C++, Java, Cobol, ML and others. Increasingly, many software languages are robust, such as Java and ML, meaning that they operate in an environment so removed from the machine level resources that an executed program cannot typically corrupt the host machine memory or crash the host machine. While robust languages provide protection against host machine corruption and crashing, robust languages tend not to be particularly efficient.

By contrast, the C-family of languages, including C and C++ (hereinafter referred to as "C languages"), can be much more efficient, although not robust. To this end, the C languages allow extensive access, control and manipulation of host machine resources such as memory. As a consequence, C language programs can be prone to buffer overruns and other memory misallocation errors that crash or hang the program.

Although C language programs lack the robustness of programs written in Java and other such languages, the need for efficiency in programming has resulted in the continued extensive use of the C languages. To capitalize on the potential efficiencies, C language programmers attempt to optimize memory usage based on knowledge of the application being written. For example, extensive control over memory also supports memory-mapped I/O, which is important for system level programming. Such extensive control, however, increases the potential for memory misuse errors, and even provides potential security issues.

While extreme care may be used to ensure that a particular C language application does not misuse or improperly overwrite memory, a problem arises from the fact that nearly all C language programs incorporate standard (or non-standard) library functions which are not written by the application developer. In particular, as is known in the art, C language development kits make available large numbers of common functions in the form of libraries. For example, one library of functions may include input/output oriented functions, while another library includes string handling functions. Multiple libraries of such functions are often "included" in application software.

The problem with standard library functions is that they may or may not have had extensive testing to determine whether they are sufficiently robust so as to avoid crashing and security breaches. Accordingly, incorporation of standard C language library functions may make an otherwise robust software application prone to memory allocation errors.

While it is possible to develop software without using standard library functions, thereby allowing the developer absolute control the robustness of the application, such a scenario is impractical. The high labor cost associated with software development does not reasonably allow for each new application to recreate the same standard functions. Thus, the use of commercial off the shelf library C language functions is a necessity.

Solutions have been proposed to overcome the problems posed by standard library functions. Such solutions envision implementation of a software wrapper around certain C language functions. The wrappers intercept calls to the function, and then determine whether any of the inputs to the function was invalid. Descriptions of such wrappers may be found in Fetzer, Christof and Xiao, Zhen "Detecting Heap Smashing Attacks Through Fault Containment Wrappers", *Proceedings of the 20th IEEE Symposium on Reliable Distributed Systems* (IEEE, October, 2001), which is incorporated herein by reference.

By intercepting function calls and determining if variables passed to the function are invalid, the wrapper can prevent execution of the function if execution of the function with the passed variables could cause a security breach or system failure. However, the development of such wrappers for each function involves extensive modeling and analysis. As a consequence, attempting to develop custom wrappers for the multitude of functions in various libraries can be cost prohibitive.

Accordingly, there is a need for a method to ensure robust operation of potentially non-robust software libraries that does not suffer from the drawback of requiring extensive modeling and analysis.

SUMMARY OF THE INVENTION

The present invention addresses the above need, as well as others, by providing an at least partially automated method of generating robust argument types for library functions. The robust argument types may be used by a software wrapper to determine the validity of arguments in a function call by application software to the library function. Thus, if an application calls the library function using an argument that is not a robust argument type, then the wrapper returns an error and the function is not called. The at least partially automated process of generating robust argument types helps make the process of developing software wrappers for large libraries of functions practicable.

A first embodiment of the invention is a method that includes a step of executing a software function using a set of test arguments and obtaining a result corresponding to each of the set of test arguments, each result indicating one of a set of robust and non-robust results, a subset of test arguments corresponding to robust results. The method further includes defining a set of arguments based on the results and the set of test arguments, the set of arguments including the subset of test arguments. Thereafter, arguments of subsequent calls to the software function may thereafter be examined to determine whether they fall within the set of arguments.

Another embodiment of the invention is code, stored in a computer storage device, that carries out the above steps.

The above described features and advantages, as well as others, will become more readily apparent by reference to the following detailed description and accompanying drawings.

DETAILED DESCRIPTION

Figure 1:
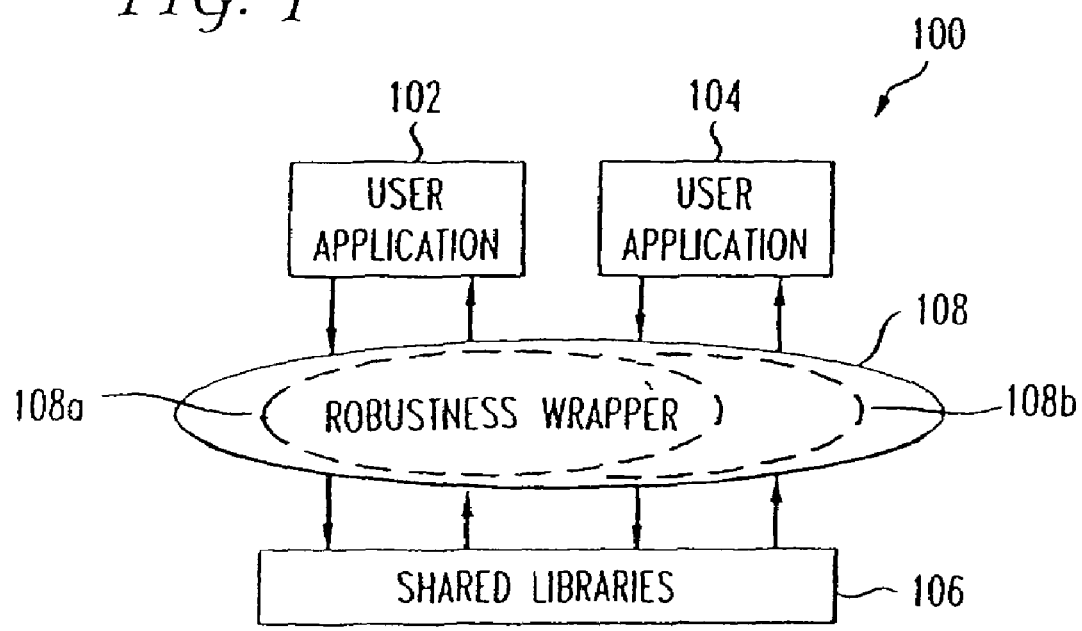
FIG. 1 shows a block diagram of an exemplary software architecture that incorporates the present invention.

FIG. 1 illustrates an exemplary software architecture 100 that incorporates wrappers generated in accordance with the present invention. In particular, FIG. 1 illustrates the run-time architecture of one or more user applications 102 and 104 that employ one or more functions of one or more shared libraries 106. A set of robustness wrappers 108 generated in accordance with the present invention are logically interposed between the user applications 102 and 104 and the shared libraries 106.

Figure 2:
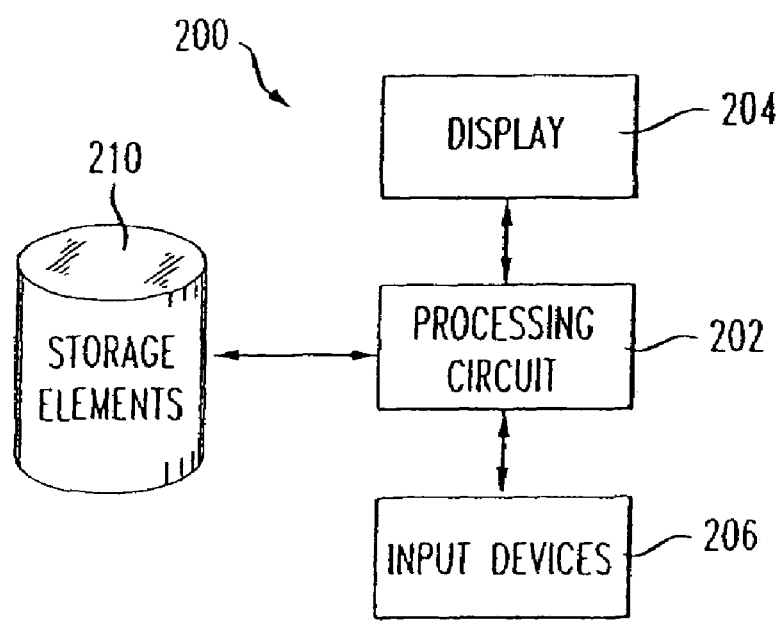
FIG. 2 shows a block diagram of an exemplary computing device that incorporates aspects of the present invention.

The software architecture 100 may be implemented in code executed by one or more computing devices, such as the exemplary computing arrangement of FIG. 2. Referring to FIG. 2, the exemplary computing arrangement 200 includes a processing circuit 202, a display 204, a set of input devices 206, and storage elements 210. The computing arrangement 200 may suitably be a single general purpose computer, such as a commercially available computer available from Dell Computer Corporation. Alternatively, the computing device 200 may also be implemented as a plurality of computing devices arranged in a local area network, an enterprise-wide network, or an internetwork.

The processing circuit 202 comprises one or more processing devices and related support circuitry. Multiple processing devices may be enclosed within a single general purpose computer or distributed over several computers in a network setting. A processing device of the processing circuit 202 may suitably comprise a Pentium® type microprocessor available from Intel Corporation.

The display 204 may be one or more suitable displays operable to give human-perceptible output. To this end, the display 204 may comprise a CRT display, an LCD display, a plasma display, or even a haptic display. The input devices 206 may comprises a plurality of devices operable to provide user input to a computer, including alphanumeric keyboards and keypads, mice, light pens, other pointing devices, and even microphones. The input devices 206 may also include communication interfaces connected to other computing devices, not shown, but which are well known in the art.

The storage elements 210 include a variety of data storage devices accessible to the processing device, including random access memory, read-only memory, flash programmable memory, hard disk, removable compact disk and floppy disk, tape devices and any combinations of the foregoing.

Referring FIG. 1 and FIG. 2, code for at least one of the user applications 102, the robustness wrapper 108 and the shared libraries 106 are suitably stored within the storage elements 210. If the computing arrangement 200 is implemented as a network, the code for the user applications 102, 104, the shared libraries 106 and the robustness wrapper 106 may be distributed over multiple physical storage elements. Those of ordinary skill in the art may readily devise their own implementation details. Any suitable implementation of a shared (or unshared) C-library may be used, with the wrapper 106 implemented in a manner similar to the C-library.

In general, the user applications 102 and 104 may be any applications that employ potentially non-robust functions from the shared library 106. In general, the embodiment described herein uses a shared C language library as the shared library 106, which contains C or C++ programs. The functions of the shared library 106 are preferably commercial off the shelf libraries such as, for example, the glibc2.2 library available from RedHat Linux.

The robustness wrappers 108 are made of up one or more wrappers 108a, 108b, etc., each wrapper 108x is comprised of code configured to cause the processing circuit 202 to receive or intercept a function call to a corresponding library function from the shared libraries 106. The function call will typically include at least one argument that represents a value from the user application that is passed to the library function for use during execution of the library function. For example, the function call asctime(tm) calls the function asctime from the glibc2.2 with the argument tm. The argument tm is a point er to the structure that represents a current time value.

The robustness wrapper 108x further includes code for determining if the argument(s) is(are) a robust argument type. A robust argument type is a data structure that will not cause a robustness fault when used as an argument in a call to the library function. As discussed above, many library functions are not completely robust, because if certain structures are passed to the functions in the arguments, the function will crash, hang-up or write to an invalid portion of memory. Such faults are robustness faults. By contrast, if a library function merely returns an error, without crashing, hanging up or an improper memory access, it is not necessarily a robustness fault. Those structures that could crash, hang-up or perform an invalid write are not robust argument types. Only structures that do not cause such faults are considered to be robust argument types.

The set of robust argument types is previously determined by automatically injecting test data structures into the library function to determine a set of data structure types that do not cause faults when used as an argument passed to that function. Further detail regarding the generation of robust argument types is provided below in connection with FIGS. 3 through 7.

The robustness wrapper 108x further includes code for performing the library function call if the argument(s) is(are) determined to be a robust argument type, and for returning an error notification if the argument is not a robust argument type. Thus, each robustness wrapper 108x operates to inhibit calling a function using a non-robust argument type.

Figure 3:
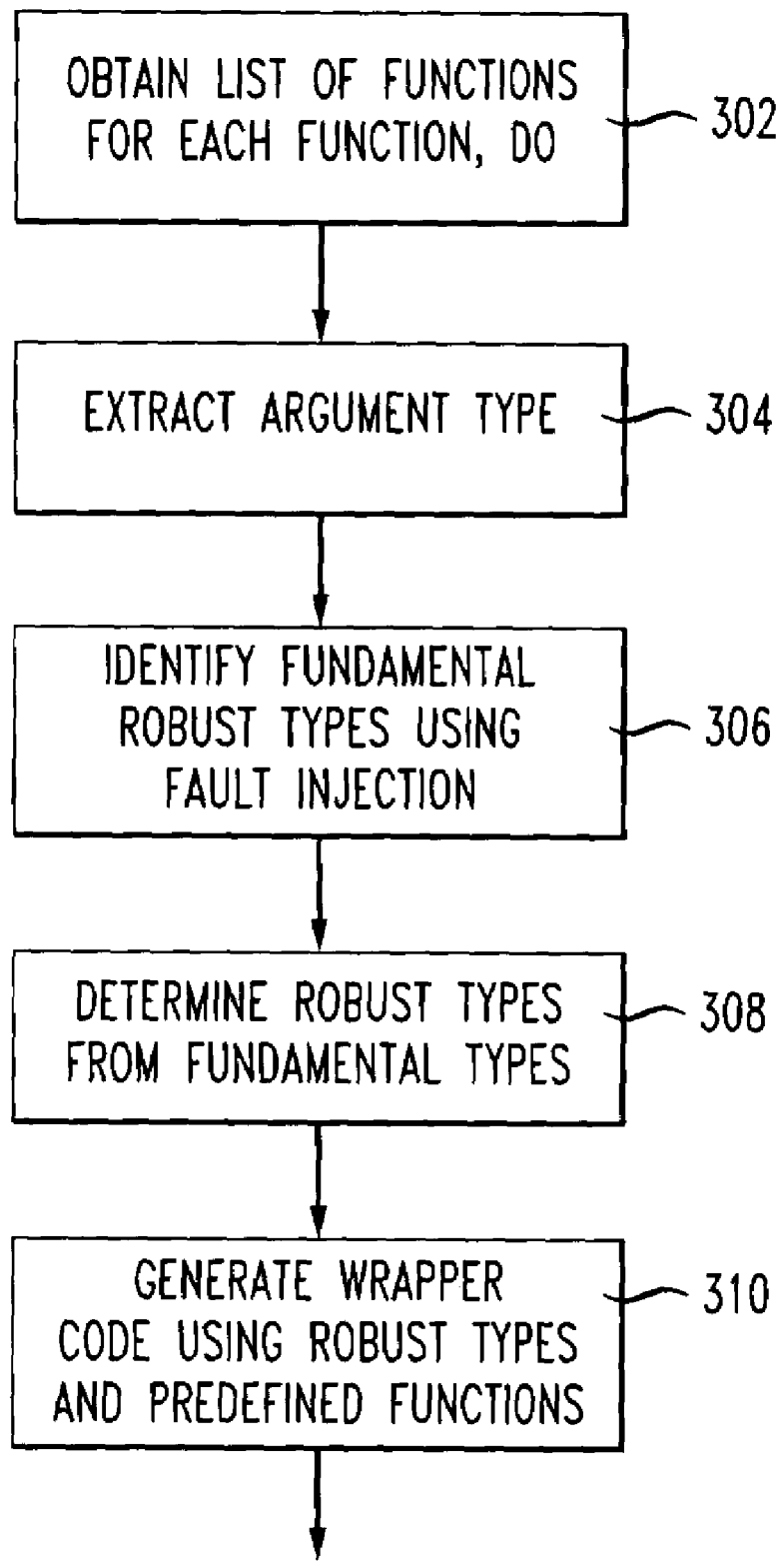
FIG. 3 shows a flow diagram of an exemplary set of operations for generating a software wrapper in accordance with the present invention.

In accordance with one aspect of the invention, each robustness wrapper 108x is at least partially automatically generated using fault injection to determine the robust argument types. FIG. 3 described below provides an exemplary set of steps in which a robustness wrapper such as the robustness wrappers 108a and 108b may be generated.

Referring to FIG. 3, there is shown a general robustness wrapper generation method that may be used to generate robustness wrappers for each library of functions. Within FIG. 3, steps 304–308 operate to compute the robust argument types for an individual function, which is repeated for each library function of the shared library. The result is used in step 310 to generate a robustness wrapper for library functions that may be directly called by a user application.

In general, the operations of FIG. 3, as well as FIGS. 4–7, may be carried out at least in part by one or more processors using corresponding code stored in a storage element. The processor may be a processor within the processing circuit 202, using code stored in one or more storage elements, such as the storage elements 210 of FIG. 2. However, it will be appreciated that the processor and storage elements used to carry out the operations of FIGS. 3 to 7 may be disposed in a different computing device than the computing arrangement that performs the operations described above in connection with FIG. 1. However, such other computing device would have the same general architecture as that discussed above in connection with FIG. 2.

Referring again to FIG. 3, in step 302, a list of functions is obtained for the library being wrapped. In general, a robustness wrapper need only be generated in C-libraries for those functions that may be called directly from a user application. Most C-libraries adopt the convention that all names beginning with an underscore, e.g. _IO_fflush, denote internal functions that are not to be used by applications. Accordingly, step 302 may be automated by employing the processor to parse a directory of functions in the library and obtain a list of functions that do not begin with an underscore.

Once the list of functions to be wrapped has been obtained, steps 304 through 308 are executed for each function on the list.

In step 304, the argument or arguments for the function are determined. In particular, the "types" of any arguments employed in library function call are identified. In general, one may determine the types of arguments for a function from text descriptions of the library functions. Indeed, all library functions must have some descriptions or application developers would not be able to use the functions.

The determination of argument types may be automated in C++ libraries wherein the function name and argument type are encoded in each function's symbol name. Accordingly, for C++ libraries, the processor may be programmed to extract the function name and type information from the symbol name of each function.

In ordinary C libraries, the operation may be partially automated by parsing header files that contain the prototypes of the global functions. Unfortunately, however, many C libraries do not include a well-defined set of header files that describe the interface of the shared library. To determine the proper set of header files that contain the prototypes of the function, the on-line text manual page that describes the function may be parsed. By convention, manual pages contain a list of all header files that need to be included by a program that wants to use the function. Thus the processor could be programmed to parse out the function argument type information from the manual page. If a function has no manual page, the processor may search through all of the header files in the library to locate the prototype of the function.

In step 306, the fundamental robust types for the function are identified. A type is a characterization of a data structure, variable, or pointer. For example, common C types include float, int, and pointers. A robust type is a data type that does not cause the function under test to exhibit a robustness fault. In the embodiment described herein, robust types are specially-defined subsets of the standard C types. As discussed above, the wrapper determines whether an argument in a function call is a robust argument type, or in other words, within the specially-defined subset of C types that does not cause a robustness fault. A fundamental robust type is a generic basic building block which may be combined with other fundamental robust types to form a single unified robust type.

Figure 4:
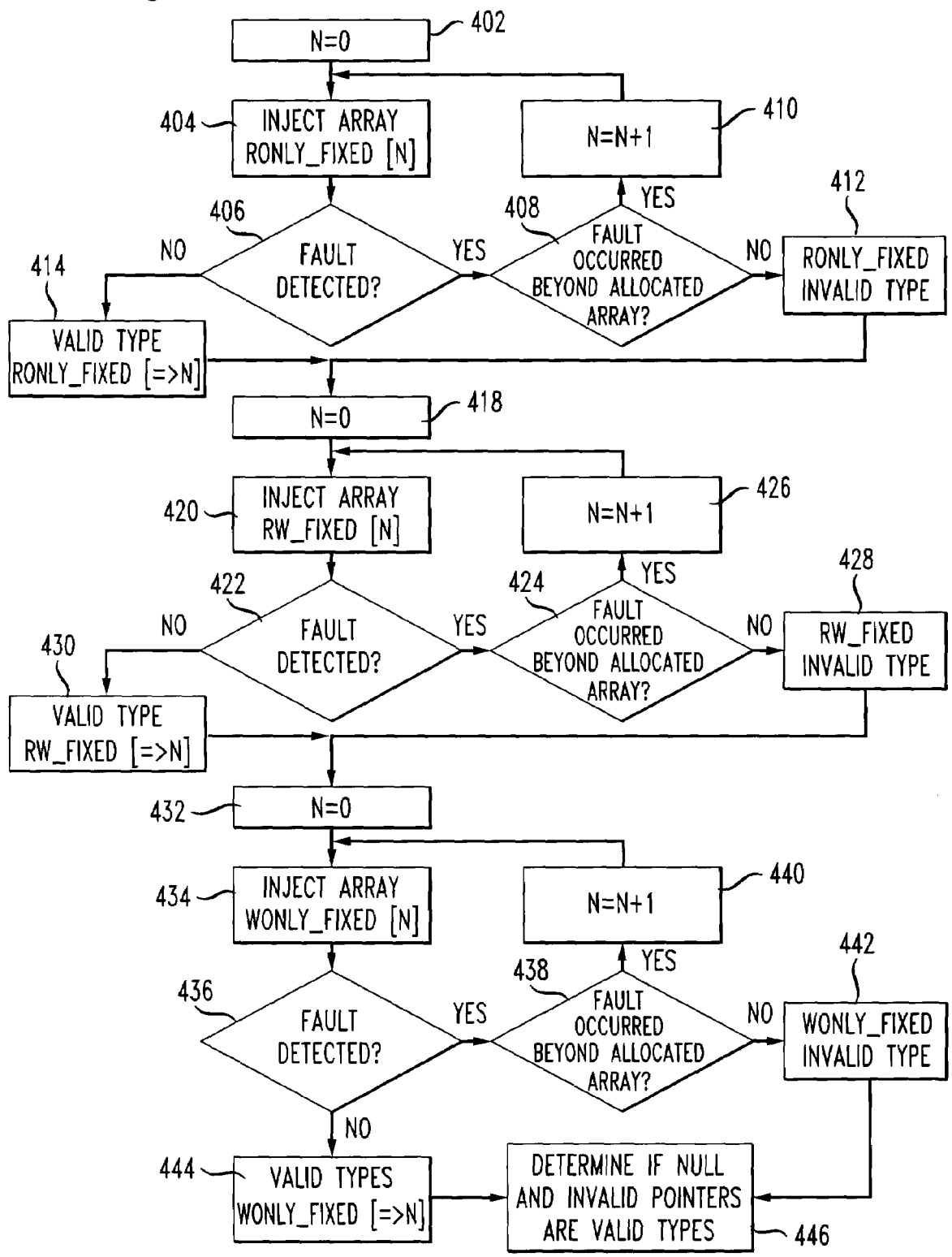
FIG. 4 shows a flow diagram of a first exemplary automated method of generating fundamental robust argument types in accordance with the operations of FIG. 3.

In the embodiment described herein, the processor determines the fundamental robust types by performing a partially predetermined set of fault injection tests. The set of fault injection tests corresponds to the argument type expected for the function. Thus, if the argument type of the library function is a fixed array pointer, then a particular set of fault injection tests is performed that correspond to fixed array pointers. FIG. 4, for example, shows an exemplary flow diagram of injection tests performed for function having a fixed array pointer type argument.

Figure 5:
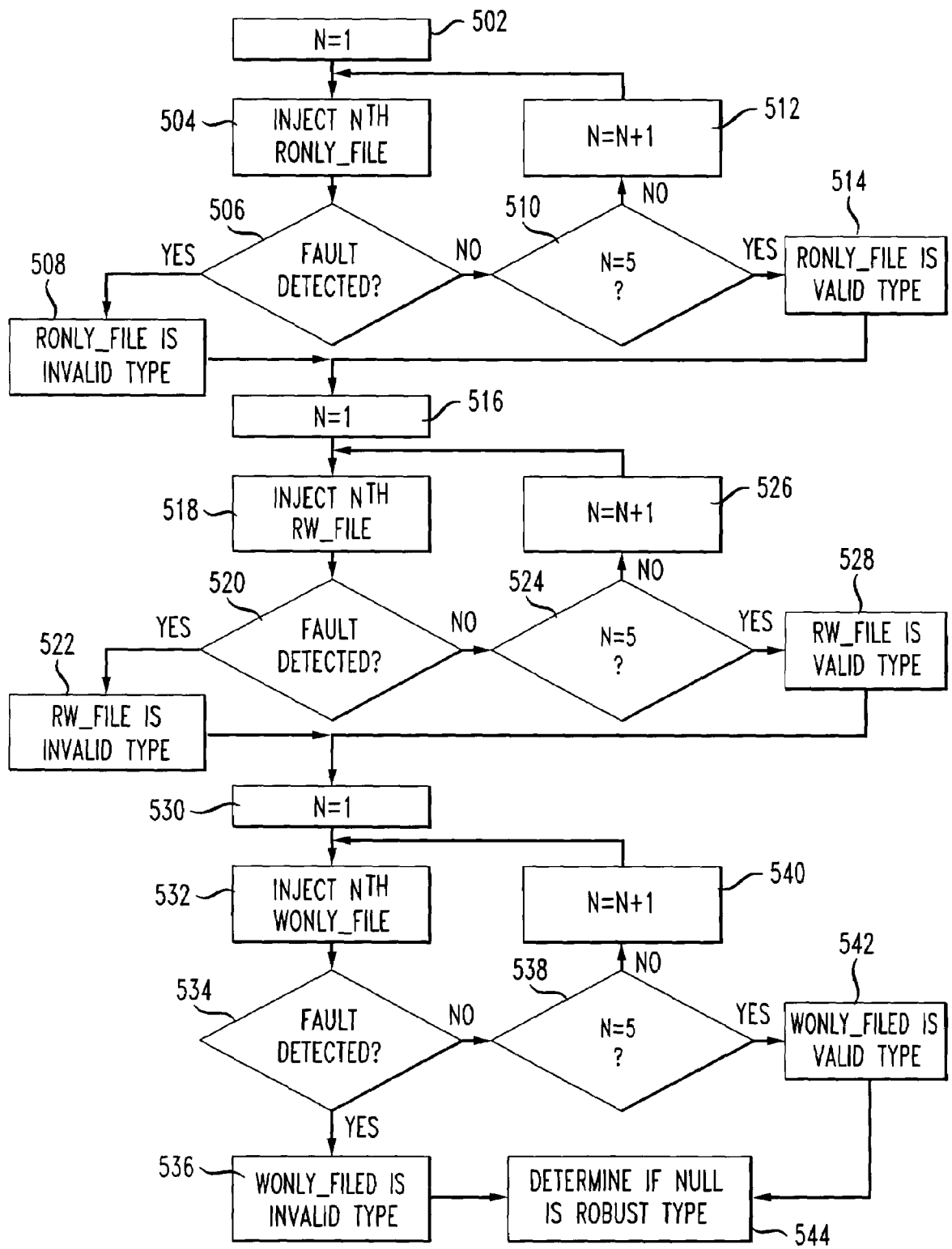
FIG. 5 shows a flow diagram of a second exemplary automated method of generating fundamental robust argument types in accordance with the operations of FIG. 3.
Figure 6:
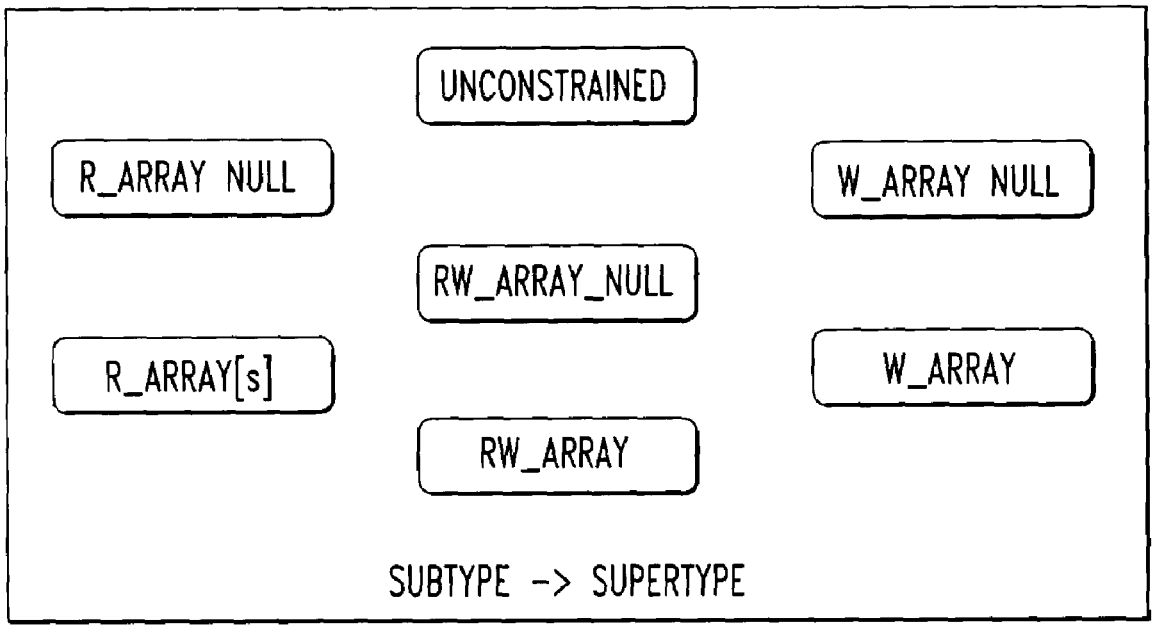
FIG. 6 shows a logic chart illustrating a first exemplary scheme for converting fundamental argument types into final robust types in accordance with the operations of FIG. 3.

In general, each argument type is divided into a set of fundamental types. The fundamental types are non-overlapping, but should as a group represent most or all possible data structures associated with an argument type. FIGS. 3 and 5 discuss the fundamental types for fixed array pointers. FIGS. 4 and 6 discuss the fundamental types for file pointers.

The set of fault injection tests are configured to determine whether each of the set of fundamental types corresponding to the argument type is robust or is not robust. To this end, the set of fault injection tests injects various fundamental types as arguments to determine whether they cause a robustness fault. Specific examples of fault injection tests for such fundamental types are provided in connection with FIGS. 4 and 5.

Thus, fault injection test sequences are developed for multiple generic argument types. Accordingly, step 306 may be automated by employing the processor to execute the test sequence for the argument type or types for the specified function. For example, if the processor determines in step 304 that the function has a fixed array type argument, the processor performs the test sequence shown in FIG. 4 and discussed below. However, if the processor determines in step 304 that the function has a different type argument then a different test sequence is performed.

In step 308, a robust type for the function is determined from the one or more fundamental robust types determined in step 306. In particular, if multiple fundamental robust types are determined in step 306, then the fundamental robust types are combined into a superset of types that do not cause robustness faults. To this end, an at least partially predetermined group of robust types are defined for possible combinations of robust function types. Thus, a predetermined set of rules is available to dictate how the fundamental robust types may be combined.

Figure 7:
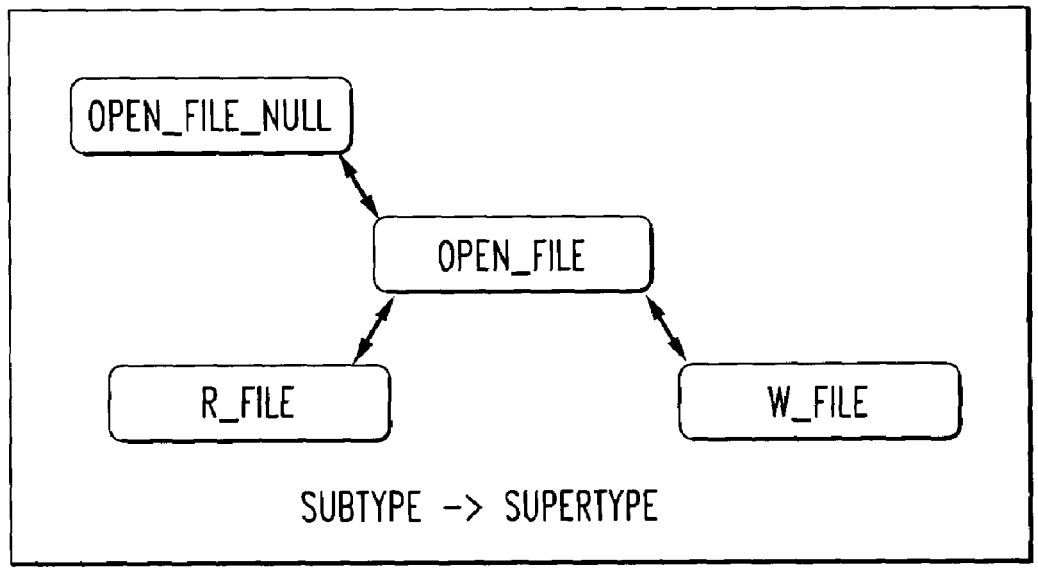
FIG. 7 shows a logic chart illustrating a second exemplary scheme for converting fundamental argument types into final robust types in accordance with the operations of FIG. 3.

By way of example, FIG. 7 shows a chart illustrating the combination rules for fundamental types associated with for file pointer argument types. The chart shows all of the relevant fundamental types, here illustrated as RONLY_FILE, WONLY_FILE, RW_FILE and NULL. After step 306, all or some of those fundamental types have been determined to be robust fundamental types. To determine the robust type from the robust fundamental types, the chart is traversed upward from the robust fundamental types until the next upward combined type would include a non-robust type. A non-robust type is (or includes) a fundamental type for which at least one argument will cause a robustness fault of the function, as determined in step 306.

Thus, by way of example, if fault injection tests using "write only" file pointers and null pointers result in robustness failures (e.g. a buffer overrun faults), but no fault injection tests for "read only" or "read/write" files result in robustness faults, then the robust fundamental types would only be the RONLY_FILE and RW_FILE fundamental types. The WONLY_FILE fundamental type is not robust. The only upwardly located robust type on the chart of FIG. 7 that does not include WONLY_FILE or NULL is R_FILE. Thus, step 308 in such a case would determine R_FILE to be the highest robust type. In general R_FILE represents any file that can be read, including read only and read-writable files.

FIG. 6 shows another example of a chart defining the operation of determining a robust type from one or more fundamental robust types. FIG. 6 shows a chart used for functions having fixed array pointer arguments.

Referring again to FIG. 3, step 308 may be automated by programming the processor to execute the rules illustrated in the charts of FIGS. 6 and 7, as well as other analogous charts quantity of memory that must be allocated to the argument, if any, in order to be robust. For example, a robust type for a fixed array argument may require 44 bytes of allocated memory.

An example of robust types having both a type element and a size element are discussed below in connection with FIGS. 4 and 6. It is noted that other robust type definitions do not include a size element. An example of robust types having only a type element are discussed below in connection with FIGS. 5 and 7. The determination of whether a particular robust type should include a size element will depend upon whether a particular argument type is of the sort that may have a selectable memory allocation, such as a fixed array.

In any event, once the robust type has been identified for the library function, step 310 is executed. In step 310, the robustness wrapper code itself is generated. To this end, the function name and the data acquired in steps 304, 306 and 308 is applied to a software shell. An exemplary shell is provided below:

```
char*functionname(const struct tm* argument)       / intercepts call to functionname
                                                   / with argument
            char* ret                              / declares return value pointer
            if(in_flag) {                          / check if already wrapper
                        return (*libc_functionname) (argument);   / if already in wrapper, go ahead
                                                   / and skip the check
            }
            in_flag = 1;                           / set "in wrapper" flag
            if (!check_robtype(argument,robsize))  / call checking function for robust
                                                   / type determined in step 308,
                                                   / robtype identifies the type
                                                   / element and robsize is the size
                                                   / element of the robust type. Some
                                                   / robust types have no size elem-
                                                   / ents. The "If" statement acts on
                                                   / the result of !check_robtype:
                                                   / If argument is not robust type,
                                                   / then perform bracketed steps
            {
                        ret = (char*) NULL;        / return error signifier NULL
                                                   / to original function call because
                                                   / argument is not robust type
                        goto PostProcessing;       / skip ahead
            }
                        ret = (*libc_functionname)(argument);   / perform original function
                                                   / with argument and save
                                                   / return value as ret.
                                                   / this is performed when If
                                                   / statement is false because
                                                   / argument is a robust type
            PostProcessing
            in_flag = 0;                           / turn off flag to leave
            return ret;                            / provide ret value to user
                                                   / application
}
``` corresponding to other generic argument types. The result of step 308 in any event is a robust type definition for the function. Thus, if the library function is called with an argument that falls within the definition of the robust type, the function call will not cause a robustness fault, such as a hang-up, an invalid overwrite to memory, or a crash.

It will be appreciated that the robust type definition determined in step 308 may include both a type element and a size element. A type element defines a characteristic of the memory block allocated to a robust argument, such as "read-only", "write-only", "readable", or "writeable and null". (See e.g. FIGS. 6 and 7). A size element defines the To generate the final wrapper code from the above shell, the functionname, the robtype and robsize (if any), are obtained from the information generated in steps 304–308. For example, the functionname is the name of the library function, robtype is the type element of the robust type determined in step 308, and robsize is the size element of the robust type definition.

A "check" function is developed for each type element of each robust type definition. If a size element is included in the robust type definition, it is passed as an argument to the "check" function for the appropriate robust type type element. Each check function determines 1) if the memory or buffer allocated to the pointer being passed to the function is of the corresponding type (readable, writeable, null, etc.) and 2) if the memory or buffer allocated to the pointer or variable being passed to the function has sufficient memory allocated to it.

The check functions for all of the potential robust types are pre-developed, and several methods may be used to generate suitable check functions. One method involves tracking variable and pointer declarations during the user application run time so that when a function is called with a variable or pointer declaration, the wrapper knows details regarding its type and size. To implement such a method the wrapper library may include a function that intercepts all malloc calls and tracks the memory allocated to each pointer or variable as a result of the malloc calls.

Further detail regarding generating argument checking functions is provided in Christof Fetzer and Zhen Xiao, "Detecting Heap Smashing Attacks Through Fault Containment Wrappers", *Proceedings of the 20th IEEE Symposium on Reliable Distribution Systems*, (October, 2001), which is incorporated herein by reference, and Frederic Salles et al., "Metakernels and Fault Containment Wrappers", discussed further above.

FIG. 4 shows an example of a fault injection test sequence that may be used for library functions that are determined to have arguments that are fixed array pointers. Library functions having fixed array pointer arguments can be particularly prone to robustness faults because the library function may attempt to write too much data to the memory allocated to the array. In such a case, a computer crash or even a security breach can occur. Moreover, certain library functions may fail if a pointer to "write-only" or "read-only" memory is passed to the function.

Accordingly, the robust type definition operation of the present invention determines which allocated memory types and allocated memory size will not result in a robustness fault.

As mentioned above, FIG. 6 shows a chart that defines the possible robust types for a fixed size array, including the possible fundamental robust types, RONLY_FIXED[v], RW_FIXED[v], WONLY_FIXED[v], NULL, and INVALID, wherein v represents the size element of the type. The fundamental type RONLY_FIXED[v] represents all fixed arrays that are read-only and require at least v bytes of allocated space. The fundamental type RW_FIXED[v] represents all fixed arrays that are read-writeable and require at least v bytes of allocated space. The fundamental type WONLY_FIXED[v] represents all fixed arrays that are write-only and require at least v bytes of allocated space. The fundamental type NULL represents a null pointer and the fundamental type INVALID represents a pointer to an inaccessible memory region. It is noted that some library functions have a limited amount of inherent robustness and therefore may be able to successfully handle a null or invalid pointer. As a consequence, null pointers and invalid pointers can be robust fundamental types, even though they can result in an error.

Referring again to FIG. 4, the operations shown therein describe a test sequence employed for functions having a fixed array argument. The steps of FIG. 4 may be performed by any suitable processor. The instructions for carrying out the steps of FIG. 4 may be stored as code in any suitable memory device or devices.

In step 402, a counter N is set to zero. The counter N represents the size of the allocated block of memory that is to be injected into to a library function. After step 402, the processor executes step 404.

In step 404, the processor injects a read-only array having an allocated size of N bytes into the library function to determine if the RONLY_FIXED[N] is a robust type. Because the counter N starts at zero, the first pointer that is injected is a zero-size array. One purpose of the injection is to determine if the library function attempts to write data beyond the N-sized block of memory allocated to the array. Another purpose of the injection is to determine whether the library function can handle read-only, write-only or read-write files without a robustness fault.

Figure 8:
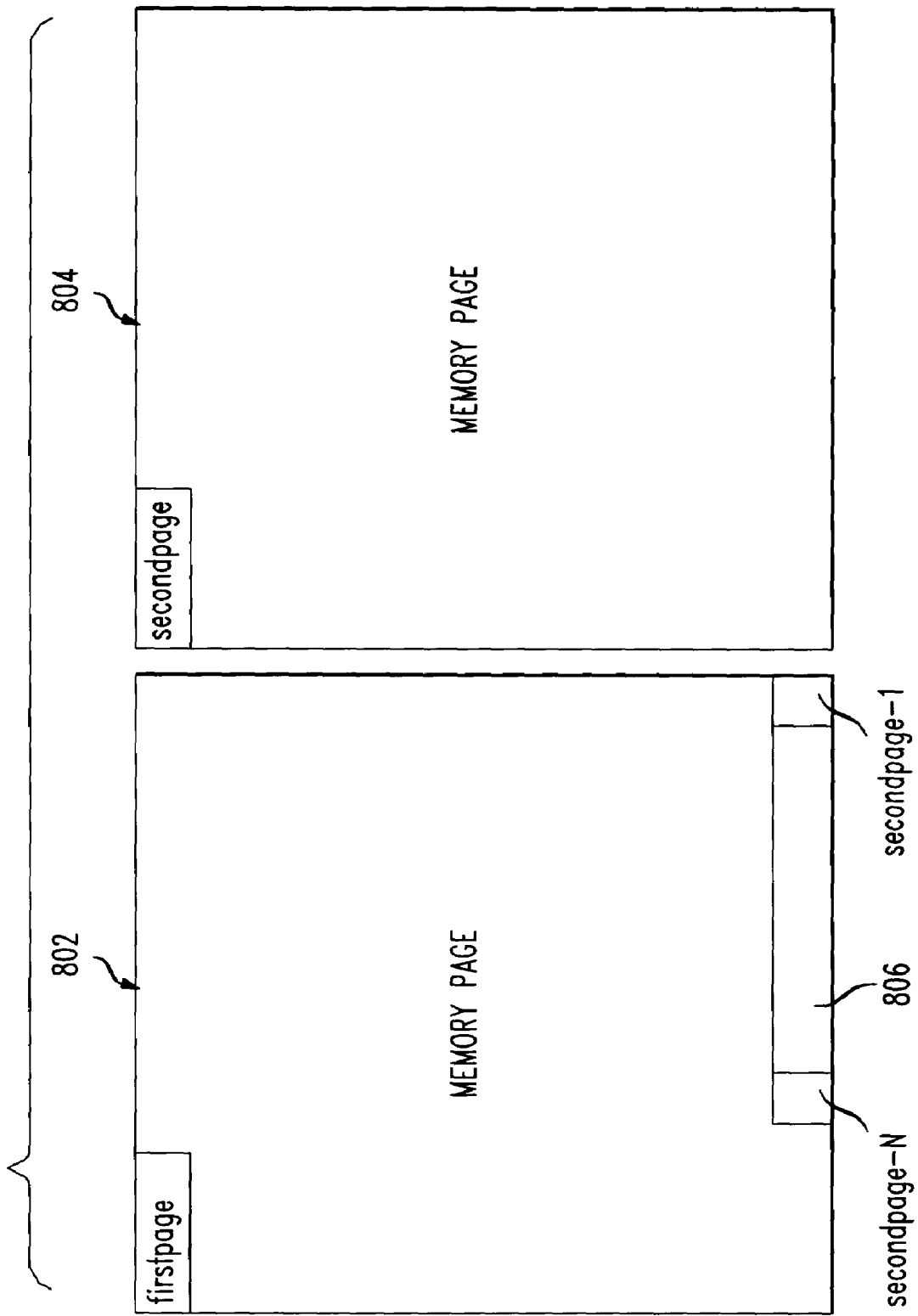
FIG. 8 shows a diagram of memory allocated by the fault injector during the injection of a fixed size array of size N.

To this end, the processor generates a child process that calls the library function using the pointer to the N-sized read-only array. Referring to FIG. 8, the child process first allocates two adjacent memory pages 802 and 804, the memory page 802 having a starting address of firstpage and an ending address at secondpage-1. The memory page 804 has a starting address at secondpage and is protected to prohibit any read or write access. The child process then allocates the memory to the N-sized read-only array, by allocating a block 806 of N bytes starting at the address secondpage-N.

As a consequence, if too little space is allocated, the child process commits a buffer overrun error that corrupts (or attempts to corrupt) the available second page 804. Because the second page 804 is memory protected, it will generate a signal that allows the child process to detect that a buffer overrun has occurred. If, however, sufficient space has been allocated, then the child process does not generate a buffer overrun error. In addition, the child process may crash, hang-up or return a buffer overrun if the library function cannot handle a read-only array in a robust manner. Even if the child process hangs up or crashes, the parent process (the operations of FIG. 4) will continue, with the knowledge that some robustness fault occurred.

Referring again to FIG. 4, once the test pointer RONLY_FIXED[N] has been injected and results obtained, then the processor executes step 406. In step 406, the processor determines whether a robustness fault has occurred. A robustness fault is a buffer overrun or other fault (i.e. crash or hang) that is not handled by the library function itself. It is noted that if the library function adequately handles an improper input without a buffer overrun, crash, hang or other unsafe condition, even if it returns an error value, then that argument is nevertheless considered to be robust. Thus, the processor 406 determines whether a robustness fault has occurred, not simply whether an error was detected.

If it is determined in step 406 that a robustness fault has occurred, then the processor executes step 408. In step 408, the processor determines whether the fault occurred at the address beyond the last address allocated to the array RONLY_FIXED[N]. In particular, the processor determines whether a "buffer overrun" error occurred, and if that error occurred at the address secondpage. If so, then it is an indication that the library function cannot handle arrays of size N in a robust manner. In such a case, the processor increases N in step 410 and returns to step 404 to proceed accordingly. If not, however, then it is an indication that the failure was due to the fact that the library function cannot generally handle read-only arrays in a robust manner. In such a case, the processor proceeds to step 412 in which the processor identifies RONLY_FIXED[N] as an invalid or non-robust type, regardless of the size N.

Referring again to step 406, if it is determined that no robustness fault was detected after injecting RONLY_FIXED[N] in step 404, then it is an indication that the library function can handle read-only arrays of size N in a robust manner. In general, if the library function can handle arrays of a size N in a robust manner, then the library function can handle larger arrays (≧N) in a robust manner. In other words, if the library function does not create a buffer overrun with an array having N bytes allocated to it, then the library function will not create a buffer overrun with an array having more than N bytes allocated to it. Thus, if it is determined in step 406 that no robustness fault was detected, the processor executes step 414 in which it is determined that RONLY_FIXED[≧N] is a robust fundamental type.

After either of steps 412 or 414, the processor executes step 418.

In step 418, the block size value N is reset to zero. After step 418, the processor executes step 420. In step 420, the processor injects a read-writeable array having an allocated size N into the library function to determine if the RW_FIXED[N] is a robust type.

Similar to step 404, the processor in step 420 generates a child process that calls the library function using the pointer to the N-sized read-writeable array. As with step 404, the child process first identifies two adjacent available memory pages 802 and 804, the memory page 802 having a starting address of firstpage and an ending address at secondpage-1. The memory page 804 has a starting address at secondpage. The child process then allocates the memory to the N-sized read-writeable array by allocating a block 806 of N bytes starting at the address secondpage-N.

Referring again to FIG. 4, once the test pointer RW_FIXED[N] has been injected and results obtained, then the processor executes step 422. In step 422, the processor determines whether a robustness fault has occurred.

If it is determined in step 422 that a robustness fault has occurred, then the processor executed step 424. In step 424, the processor determines whether the fault occurred at the address beyond the last address allocated to the injected array. In particular, the processor determines whether a "buffer overrun" error occurred, and if that error occurred at the address secondpage. If so, then the library function cannot handle arrays of size N in a robust manner. In such a case, the processor increases N in step 426 and returns to step 420 to proceed accordingly. If not, however, then the failure is likely due to the fact that the library function cannot generally handle read-writeable arrays in a robust manner. In such a case, the processor proceeds to step 428 in which the processor identifies RW_FIXED[N] as an invalid or non-robust type, regardless of the size N.

Referring again to step 422, if it is determined that no robustness fault was detected after injecting RW_FIXED[N] in step 420, then the library function can handle read-writeable arrays of size N or greater in a robust manner. In such a case, the processor executes step 430 in which it is determined that RW_FIXED[≧N] is a robust fundamental type.

After either of steps 428 or 430, the processor executes step 432.

In step 432, the block size value N is reset to zero. After step 432, the processor executes step 434. In step 434, the processor injects a write-only array having an allocated size of N bytes into the library function to determine if the WONLY_FIXED[N] is a robust type.

Similar to steps 404 and 420, the processor in step 434 generates a child process that calls the library function using the pointer to the N-sized write-only array. Referring to FIG. 8, the child process first identifies two adjacent available memory pages 802 and 804, the memory page 802 having a starting address of firstpage and an ending address at secondpage-1. The memory page 804 has a starting address at secondpage. The child process then allocates the memory to the N-sized read-writeable array by allocating a block 806 of N bytes starting at the address secondpage-N.

Referring again to FIG. 4, once the test pointer WONLY_FIXED[N] has been injected and results obtained, then the processor executes step 436. In step 436, the processor determines whether a robustness fault has occurred.

If it is determined in step 436 that a robustness fault has occurred, then the processor executed step 438. In step 438, the processor determines whether the fault occurred at the address beyond the last address allocated to the injected array. In particular, the processor determines whether a "buffer overrun" error occurred, and if that error occurred at the address secondpage. If so, then the library function cannot handle arrays of size N in a robust manner. In such a case, the processor increases N in step 440 and returns to step 434 to proceed accordingly. If not, however, then the library function cannot generally handle write-only arrays in a robust manner. In such a case, the processor proceeds to step 442 in which the processor identifies WONLY_FIXED[N] as an invalid or non-robust type, regardless of the size N.

Referring again to step 436, if it is determined that no robustness fault was detected after injecting WONLY_FIXED[N] in step 434, then the library function can handle write-only arrays of size N or greater in a robust manner. In such a case, the processor executes step 444 in which it is determined that WONLY_FIXED[≧N] is a robust fundamental type.

Thereafter, in step 446, the processor determines whether NULL and INVALID are robust fundamental types. In particular, the processor injects a null pointer into the library function and determines whether a robustness fault occurs. If not, then NULL is determined to be a robust fundamental type. The processor further injects a pointer to inaccessible memory to the library function and determines whether a robustness fault occurs. If not, then INVALID is determined to be robust fundamental type. Note that NULL and INVALID types do not have a size element.

Thus, upon conclusion of step 446, all of the fundamental types for a function having a fixed array pointer argument have been determined through a partially predetermined set of injection cases. The set of tests is said to be partially predetermined because the fault injection sequence can be iterative, testing increasing array sizes until finding a size at which no error occurs.

The above-described operations of FIG. 4 provide one example of step 306 of FIG. 3. Referring to FIG. 6, the fundamental types determined in FIG. 4 may be combined using the chart of FIG. 6. To this end, the processor determines the largest superset of fundamental robust types in the chart of FIG. 6. The determined superset does not include any non-robust types.

By way of example, consider an operation of FIG. 4 in which it is determined that the fundamental robust types are RONLY_FIXED[≧44], RW_FIXED[≧44] and NULL. Referring to the chart of FIG. 6, such fundamental types can be combined to the highest superset R_ARRAY_NULL [≧44], which basically includes any array that can be read (either read-only or read-writeable), and has allocated to it at least 44 bytes, or a null pointer.

Thus, operation of step 308 of FIG. 3 would yield R_ARRAY_NULL[≧44] in such an example. Taking the example further, assume that the library function name in the example is asctime, which is known to have a fixed array pointer argument. In such a case, in step 310, the following wrapper code would be generated:

```
char* asctime(const struct tm* a1)      / intercepts call to asctime
                                        / with argument a1
    char* ret                           / declares return value pointer
    if(in_flag) {                       / check if already in wrapper
        return (*libc_asctime) (a1);    / if already in wrapper, go ahead
                                        / skip the check and call asctime
    }
    in_flag = 1;                        / set "in wrapper" flag
    if (!check_R_ARRAY_NULL(a1, 44))    / call checking function for robust
                                        / type determined in step 308. The
                                        / "If" statement acts on the result of
                                        / !check_R_ARRAY_NULL:
                                        / If a1 is not robust type,
                                        / then perform bracketed steps
    {
        ret = (char*) NULL;             / return error signifier NULL
                                        / to original function call because
                                        / a1 is not robust type
        goto PostProcessing;            / skip ahead
    }
    ret = (*libc_asctime)(a1)            / perform original function with
                                         / a1 and save return value as ret.
                                         / this is performed when If statement
                                         / is false because a1 is a robust type
    PostProcessing
    in_flag = 0;                        / turn off flag to leave
    return ret;                         / provide ret value to user
                                        / application
}
```

FIG. 5 shows an example of a fault injection test set that may be used in library functions that are determined to have arguments that are file pointers. Library functions may not be robust with regard to certain types of file pointers, for example, pointer to read-only files. Fundamental types for file pointers do not have a size element.

In particular, FIG. 7 shows a chart that defines the possible robust types for a file pointer that is an argument to a library function. The possible fundamental robust types include RONLY_FILE, RW_FILE, WONLY_FILE, and NULL. The fundamental type RONLY_FILE represents all file pointers that point to read-only files. The fundamental type RW_FILE represents all file pointers that point to read-writeable files. The fundamental type WONLY_FILE represents all file pointers that point to write-only files. The fundamental type NULL represents a null pointer.

Referring again to FIG. 5, the operations shown therein describe a test sequence employed for functions having a file pointer argument. The steps of FIG. 5 may be performed by any suitable processor. The instructions for carrying out the steps of FIG. 5 may be stored as code in any suitable memory device or devices.

In step 502, a counter N is set to one. The counter N represents an index to the Nth of a number of different sized test files for a particular file pointer format. After step 502, the processor executes step 504.

In step 504, the processor injects the $N^{th}$ read-only file pointer into the library function. In the exemplary embodiment described herein, pointers to five different-sized read-only files must be successfully injected into the library function before read-only file pointers will be considered to be robust. The use of multiple read-only test files allows the process to determine that the library function may robustly handle files of various sizes. It will be appreciated that more or less than five test files may be used in step 504.

Referring again to the exemplary embodiment described herein, each execution of step 504 injects a pointer to one of the five test files. The five test file sizes should range from relatively small to relatively large, which in current terms may suitably range from an empty file to a one megabyte file. Thus, when N=1, then the processor in step 504 injects a pointer to an empty read-only file, when N=2, then the processor in step 504 injects a pointer to a read-only file of, say, 32 bytes, and so forth, until N=5, at which time the processor in step 504 injects a pointer to a read-only file of one megabyte.

In any event, the processor generates a child process that calls the library function using the pointer to the $N^{th}$ test file. The child process may crash, hang-up or otherwise act destructively if the library function cannot handle the $N^{th}$ read-only file pointer in a robust manner. Even if the child process hangs up or crashes, the parent process (the operations of FIG. 4) will continue, with the knowledge that some robustness fault has occurred.

Once the $N^{th}$ RONLY_FILE pointer has been injected and results obtained, then the processor executes step 506. In step 506, the processor determines whether a robustness fault has occurred.

If it is determined in step 506 that a robustness fault has occurred, then the processor executes step 508. In step 508, the processor determines that RONLY_FILE is not a fundamental robust type. Thus, if injection of any of the RONLY_FILE file pointers causes a robustness error, then RONLY_FILE is not a robust type. After step 508, the processor proceeds to begin testing RW_FILE pointers in step 516.

If, however, it is determined in step 506 that no robustness fault has occurred, then the processor executes step 510. In step 510, the processor determines whether N=5. If not, then the processor in step 512 increases N and returns to step 504 to inject the next read-only file pointer. If, however, N=5, then the processor proceeds to step 514.

In step 514, the processor determines that RONLY_FILE is a valid or robust type. The processor thereafter proceeds to step 516 to test RW_FILE pointers.

In step 516, a counter N is reset to one. After step 516, the processor executes step 518. In step 518, the processor injects the $N^{th}$ read-writeable file pointer into the library function. As with the read-only files, pointers to five different-sized read-writeable files must be injected into the library function before read-writeable file pointers will be considered to be robust. Each execution of step 518 injects a pointer to one of those five test files. The five test file sizes should have a range similar to that of the read-only files discussed above in connection with step 504.

Once the $N^{th}$ RW_FILE pointer has been injected and results obtained, then the processor executes step 520. In step 520, the processor determines whether a robustness fault has occurred.

If it is determined in step 520 that a robustness fault has occurred, then the processor executes step 522. In step 522, the processor determines that RW_FILE is not a fundamental robust type. After step 522, the processor proceeds to begin testing WONLY_FILE pointers in step 530.

If, however, it is determined in step 520 that no robustness fault has occurred, then the processor executes step 524. In step 524, the processor determines whether N=5. If not, then the processor in step 526 increases N and returns to step 520 to inject the next read-writeable file pointer. If, however, N=5, then the processor proceeds to step 528.

In step 528, the processor determines that RW_FILE is a valid or robust type. The processor thereafter proceeds to step 530 to test WONLY_FILE pointers.

In step 530, a counter N is reset to one. After step 530, the processor executes step 530. In step 532, the processor injects the $N^{th}$ write-only file pointer into the library function. As with the other files pointer, pointers to five different-sized write-only files must be injected into the library function to ensure that write-only file pointers are robust. Each execution of step 532 injects a pointer to one of those five files. The five sizes should have a range similar to that of the read-only files discussed above in connection with step 504.

Once the $N^{th}$ WONLY_FILE pointer has been injected and results obtained, then the processor executes step 534. In step 534, the processor determines whether a robustness fault has occurred.

If it is determined in step 534 that a robustness fault has occurred, then the processor executes step 536. In step 536, the processor determines that WONLY_FILE is not a fundamental robust type. After step 536, the processor proceeds to step 544.

If, however, it is determined in step 534 that no robustness fault has occurred, then the processor executes step 538. In step 538, the processor determines whether N=5. If not, then the processor in step 540 increases N and returns to step 534 to inject the next write-only file pointer. If, however, N=5, then the processor proceeds to step 542.

In step 542, the processor determines that WONLY_FILE is a valid or robust type. The processor thereafter proceeds to step 544.

In step 544, the processor determines whether NULL is a robust type by injecting a null pointer into the library function.

The above-described operations of FIG. 5 provide another example of step 306 of FIG. 3. The robust fundamental types would then be used to generate a robust type in step 308. To this end, the fundamental types determined in FIG. 5 may be combined using the chart of FIG. 7. In particular, the processor determines the largest superset of fundamental robust types in the chart of FIG. 7. The determined superset does not include any non-robust types. The resulting superset constitutes the robust type that may be used in the generation of the wrapper for the library function.

Referring again generally to FIG. 3, it can be seen that a good portion of the wrapper generating operations may be automated, thereby making the generation of wrappers for large libraries of functions manageable.

The above-described embodiments are generalized for handling a single argument of a function. For n-ary functions (having n arguments), the computation of robust argument types can be generalized as follows. N-dimensional type vectors are defined such that the i-th element of a vector is the type of the i-th argument of the function. The partial order over types (e.g. FIGS. 6 and 7) defines a partial order over the type vectors. In particular, it introduces the notion of supersets for type vectors. Each function call by the fault-injection test sequence (e.g. step 404) consists of n test cases (referred to as a test case vector) and these uniquely define a type vector consisting of fundamental types. The value set V(TV) of a type vector TV consists of a set of value vectors that is uniquely defined by the value set of the n types.

The definition of a robust type vectors can be generalized as follows. A robust type vector of a function is the type vector TV such that all test case vectors for which the function does not exhibit a robustness fault are in V(TV) and none of the test case vectors for which the function exhibits a robustness fault is in V(TV). We call the i-th element of TV the robust type of argument i.

Accordingly, the principles described above in connection with FIGS. 1–7 may readily be implemented in functions having multiple arguments.

The above-described embodiments are merely exemplary, and those of ordinary skill in the art may readily devise their own implementations and modifications that incorporate the principles of the present invention and fall within the spirit and scope thereof. It will be appreciated that the term "C" as used herein is used to generically described "C" or "C++" attributes, unless otherwise indicated.

We claim:

1. A computer-implemented method to produce a final set of arguments, comprising:
 a) executing a software function using a set of test arguments and obtaining a result corresponding to each of the set of test arguments, each result indicating one of a set of non-robust and robust results, a subset of test arguments corresponding to robust results, wherein step a) further comprises:
   a1) forming an nth test argument comprising an array type having an allocated size m;
   a2) executing the software function using the nth test argument and determining an nth result;
   a3) incrementing n and m and repeating steps a1) and a2) if the nth result is a non-robust result; and
   a4) setting a minimum robust size M=m if the nth result is a robust result; and
 b) producing said set of final arguments based on the results and the set of test arguments, the set of final arguments including the subset of said test arguments.

2. The method of claim 1 wherein producing the set of final arguments includes producing the set of final arguments such that the set of final arguments includes the array type having an allocated size greater than or equal to M.

3. A computer program product stored on a computer-readable medium which, when executed by a processor, cause the processor to perform the steps of a method to produce a final set of arguments, comprising:
 executing a software function using a set of test arguments and obtaining a result corresponding to each of the set of test arguments, each result indicating one of a set of robust and non-robust results, a subset of test arguments corresponding to robust results, wherein the executing the software function using the set of test arguments further comprises:

forming an nth test argument comprising an array type having an allocated size m;

causing execution of the software function using the nth test argument and determining an nth result;

if the nth result is an error result, incrementing n and m and repeating forming the nth test argument comprising the array type having the allocated size m and causing execution of the software function using the nth test argument and determining the nth result; and setting a minimum size value M=m if the nth result is a robust result; and producing a set of arguments based on the results and the set of test arguments, the set of arguments including the subset of test arguments.

4. The computer program product of claim 3 further comprising producing the set of final arguments such that the set of final arguments includes the array type having an allocated size greater than or equal to M.

* * * * *